US008218498B2

(12) United States Patent
Jeong et al.

(10) Patent No.: US 8,218,498 B2
(45) Date of Patent: Jul. 10, 2012

(54) METHOD AND SYSTEM FOR LOSSLESS TRANSMISSION OF MOBILE IP PACKETS IN HANDOVER OF A MOBILE TERMINAL

(75) Inventors: Han-You Jeong, Gunpo-si (KR); Kee-Sung Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1013 days.

(21) Appl. No.: 12/068,842

(22) Filed: Feb. 12, 2008

(65) Prior Publication Data
US 2008/0192701 A1   Aug. 14, 2008

(30) Foreign Application Priority Data

Feb. 12, 2007 (KR) .......................... 10-2007-0014289

(51) Int. Cl.
*H04W 4/00* (2009.01)
(52) U.S. Cl. ........ 370/331; 370/330; 370/332; 370/334; 370/336; 370/337; 455/443; 455/561; 455/560; 455/563; 455/564
(58) Field of Classification Search .................. 370/331, 370/332, 341, 330; 455/443, 561, 562
See application file for complete search history.

(56) References Cited

U.S. PATENT DOCUMENTS

| 6,675,208 B1 * | 1/2004 | Rai et al. ........................ 709/224 |
| 7,174,166 B2 * | 2/2007 | Song et al. ..................... 455/436 |
| 2005/0083885 A1 * | 4/2005 | Ikeda et al. .................... 370/331 |
| 2006/0146797 A1 * | 7/2006 | Lebizay ......................... 370/352 |
| 2007/0171875 A1 * | 7/2007 | Suda .............................. 370/333 |
| 2007/0189281 A1 * | 8/2007 | Ishizaka ........................ 370/356 |

FOREIGN PATENT DOCUMENTS

| JP | 2001-268614 | 9/2001 |
| JP | 2004-128551 | 4/2004 |
| KR | 10-2000-0041916 | 7/2000 |
| KR | 10-2001-0007320 | 1/2001 |

(Continued)

OTHER PUBLICATIONS

*Office Action* from the Korean Patent Office issued in Applicant's corresponding Korean Patent Application No. 2007-0014289 dated Mar. 27, 2008.

(Continued)

*Primary Examiner* — Jeffrey Pwu
*Assistant Examiner* — Abdelnabi Musa
(74) *Attorney, Agent, or Firm* — H.C. Park & Associates, PLC

(57) ABSTRACT

Provided are a method and a system for transmitting mobile IP packets without loss. The method includes the steps of storing, by an old radio access station, packets that are not transmitted to a mobile terminal when a handover indication message is received, and creating, by the old radio access station, a tunnel to a new radio access station, and transmitting the stored packets to the new radio access station via the tunnel when a link-layer handover procedure is completed. Thus, upon the handover of the mobile terminal, IP packets directed to the old access control router and the old radio access station are stored in the buffer and then transmitted via the tunnel after the handover, thereby preventing loss of packets during the handover. Thus, yield cannot be degraded upon the handover and seamless network connection service can be provided.

16 Claims, 9 Drawing Sheets

FOREIGN PATENT DOCUMENTS

| | | |
|---|---|---|
| KR | 10-2004-0056584 | 7/2004 |
| KR | 10-2004-0087456 | 10/2004 |
| KR | 10-2005-0023194 | 3/2005 |
| KR | 10-2005-0067339 | 7/2005 |
| KR | 10-2006-0046710 | 5/2006 |
| KR | 10-2006-0128543 | 12/2006 |

OTHER PUBLICATIONS

Office Action from Korean Patent Office issued in Applicant's corresponding Korean Application No. 2007-0014289 dated Sep. 11, 2008.

Decision of Grant from Korean Patent Office issued in Applicant's corresponding Korean Application No. 2007-0014289 dated Sep. 14, 2008.

Decision of Grant from Korean Patent Office issued in Applicant's corresponding Korean Application No. 2007-0014289 dated Nov. 14, 2008.

Peng Li, et al. "A Seamless Handover Mechanism for IEEE 802.16e Systems." published on Nov. 2006 of IEEE, p. 1-4.

IEEE Computer Society and the IEEE Microwave Theory and Techniques Society "Part 16: Air Interface for Fixed and Mobile Broadband Wireless Access Systems. Amendment 2: Physical and Medium Access Control Layers for Combined Fixed and Mobile Operation in Licensed Bands and Corrigendum 1" published on Feb. 26, 2006 of IEEE WirelessMan 802.16, pp. 1-822.

* cited by examiner

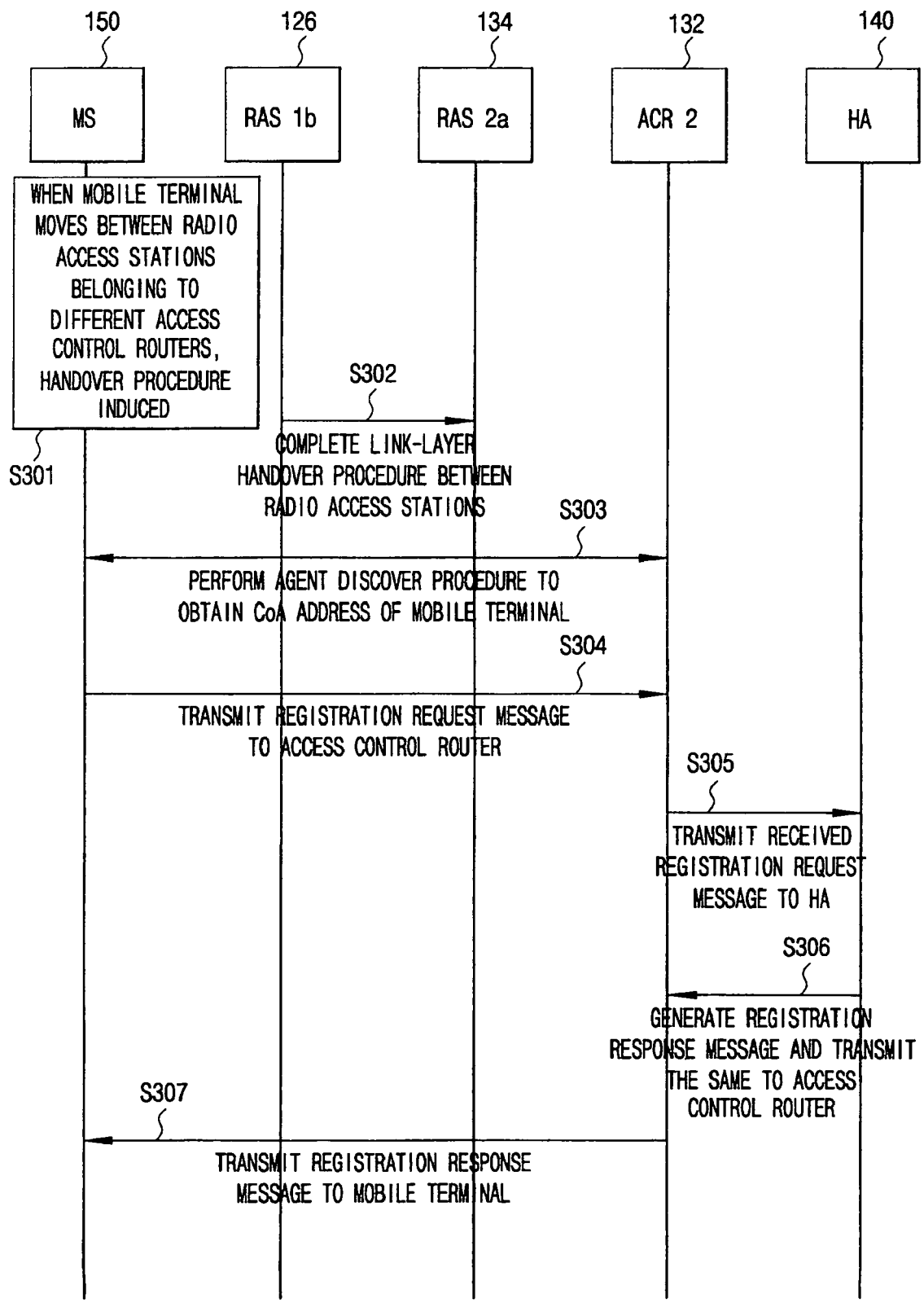

METHOD AND SYSTEM FOR LOSSLESS TRANSMISSION OF MOBILE IP PACKETS IN HANDOVER OF A MOBILE TERMINAL

CLAIM OF PRIORITY

This application claims the benefit under 35 U.S.C. §119 from an application entitled "Method and System for Transmitting Lossless Mobile IP Packets" earlier filed in the Korean Intellectual Property Office on Feb. 12, 2007 and assigned Ser. No. 10-2007-0014289, the entire contents of which are hereby incorporated herein by reference.

BACKGROUND OF THE INVENTION

1. Field of the Invention

The present invention relates to a method and system for lossless transmission of mobile IP packets, and more particularly, to a method and system for transmitting mobile IP packets without loss, in which IP packets stored in buffers of an old access control router and an old radio access station are transmitted to a new radio access station via a tunnel upon handover of a mobile terminal, so that the packets are transmitted to the mobile terminal without loss.

2. Description of the Related Art

World Interoperability for Microwave Access (WiMAX) is a technique that is being developed as a portable Internet standard by Intel Corporation. The WiMAX system supplements an existing wireless LAN 802.11a/b/g technique to greatly extend an Internet use area to outside a building.

Meanwhile, a Wireless Broadband Internet (WiBro) system is a service capable of providing long-range communication, such as portable telephones, as well as Internet data communication, such as a wireless LAN. The WiBro system may be called a portable Internet. The WiBro system is being developed as a portable Internet standard in South Korea. The WiMAX system and the WiBro system are both used as the same basic technique because they provide the portable Internet service, and are both based on Orthogonal Frequency Division Multiplexing (OFDM).

To provide the portable Internet, the WiMAX network needs to support a mobile IP. The mobile IP is a technology for a mobile terminal that uses an Internet Protocol (IP), which is a network layer protocol responsible for delivery of a connectionless datagram to a destination. A basic concept of the mobile IP is that a mobile terminal registers an address acquired on a current communication network in a home agent (HA) when accessing a remote communication network, and a home communication network sends data to the terminal located in the remote communication network. A mobile IP standard includes two parts: a mobile IP agent and a mobile node.

The mobile IP agent provides a virtual routing service to route packets to a registered mobile terminal.

The mobile node is a mobile host or a router for changing a connection point to another partial network without changing the IP address in a mobile IP network. The mobile node includes a router for transmitting an IP packet to a destination, and a host for generating and receiving packets. Examples of the host include a desktop personal computer (PC), a notebook PC, a personal digital assistant (PDA), and the like.

Currently, a concept of an IP address is used as an identifier for identifying nodes connected to the Internet. The IP address indicates a location of a node having that address. The Internet efficiently performs IP address management and packet delivery by hierarchically allocating addresses using a concept of a subnet. The subnet divides the IP address into two portions: an upper identifier used as a network identifier and a lower identifier used as an identifier for identifying nodes belonging to the network.

As a protocol defined to transmit an IP data to a mobile node moving between subnets, a mobile IP protocol manages the IP address, as follows:

First, two IP addresses are allocated to a mobile node. One address is a home address (HoA) serving as an identifier for identifying the node, and the other address is a care-of-address (CoA) that is an IP address indicating a current connection location. The mobile IP protocol allocates a new CoA each time the mobile node moves to another subnet to update current location information of the mobile node.

In this case, a service access point is provided to an upper transport layer using the HoA and a port number, so that a change resulting from movement to another subnet is invisible to an application program.

A service access point (SAP) refers to a point at which an upper layer accesses a lower layer to receive a service from the lower layer in a control operation between the adjacent layers in open system interconnection (OSI). The SAP exists on a boundary between the layers. For example, an N service access point refers to a point at which an N+1 entity in an N+1 layer accesses an N layer to receive an N service.

Since the service access point that the network layer provides to the upper layer, i.e., the transport layer, consists of the HoA and the port number, an application layer cannot recognize a subnet address after the mobile node moves to another subnet. Accordingly, the application layer cannot recognize a change resulting from the movement.

FIG. 1 illustrates a configuration of a mobile WiMAX network. The mobile WiMAX network is an OFDM-based wireless data transmission system conforming to the IEEE 802.16e standard. The mobile WiMAX network is a communication network capable of providing a seamless network connection service to a user who is moving.

The mobile WiMAX network includes a connectivity service network (CSN) 110 for providing IP-based connectivity service in an infrastructure network, and access service networks (ASNs) 120 and 130 for providing wireless access service. The access service networks 120 and 130 include radio access stations (RASs) 124, 126, 134 and 136 and access control routers (ACRs) 122 and 132. The RASs 124, 126, 134 and 136 manage a wireless resource, generate an IEEE 802.16e-based MAC frame, and schedules wireless packets. The ACRs 122 and 132 provide an IP network connectivity function and an IP router function.

A home agent (HA) 140 is a router in a subnet to which a home address of a mobile terminal 150 belongs. A foreign agent (FA) is a virtual router on a foreign network that the mobile terminal 150 in a mobile IP network visits. The mobile terminal 150, when has moved to the foreign network, obtain a care-of-address (CoA) via the FA and registers the same in the HA, the HA encapsulates a datagram directed to the mobile terminal 150 and transmits the resultant datagram to the CoA, and the FA decapsulates the datagram and transmits the same to the mobile terminal 150. The FA also serves as a default router for the mobile terminal 150 for the datagram transmitted by the mobile terminal 150.

The mobile terminal 150 is hand-held by a user, in the Mobile WiMAX network. A correspondent node (CN) 160 is a node on the network that is in communication with the mobile terminal 150. In this case, the CN 160 may not support a mobile IP protocol, but must be able to communicate with the mobile terminal 150.

FIG. 2A illustrates a mobility binding list managed by the HA, and FIG. 2B illustrates a visitor list managed by the FA.

The FA, which is a router directly connected to the node, and the HA 140, which is a router in a subnet to which the HoA belongs, build a mapping table to manage information including the CoA and the HoA.

A table managed by the home agent 140 is called as a mobility binding list 210. As shown in FIG. 2A, the mobility binding list 210 includes a mobile terminal's HoA field 212, a CoA1 field 214, and a lifetime (LT1) field 216. The HoA field 212 stores HoA information of the mobile terminal, and the CoA1 field 214 stores CoA information, which is an IP address indicating a current connection location of the mobile terminal. The LT1 field 216 stores an expiration time for keeping the above information up.

Meanwhile, a table managed by the foreign agent is referred to as a visitor list 220. Referring to FIG. 2B, the visitor list 220 includes a mobile terminal's HoA field 222, a HA field 228, a CoA2 field 224, and a LT2 field 226. The visitor list 220 further includes an HA field 228, unlike the mobility binding list 210 shown in FIG. 2A.

FIG. 3 illustrates a conventional handover procedure between different access control routers in a WiMAX network.

The mobile WiMAX network must provide a network connection service even when a subscriber carrying a mobile terminal moves to other locations. The mobile terminal measures intensity of a signal transmitted from nearby radio access stations. When the mobile terminal discovers a radio access station transmitting a signal with a greater intensity than an old radio access station, the mobile terminal changes a connection point with the network, which is called a handover.

A handover procedure between different radio access stations in the same access control router is performed according to IEEE 802.16e and WiMAX Forum NWG Stage 2/3 standard procedures. For example, in FIG. 1, the mobile terminal 150 performs the above procedure to perform the handover from the RAS 1a 124 to the RAS 1b 126, or from the RAS 2a 134 to the RAS 2b 136.

A handover procedure between different access control routers is performed according to a procedure as shown in FIG. 3. In FIG. 3, it is assumed that the mobile terminal 150 performs handover from the RAS 1b 126 belonging to the ACR 1 122 to the RAS 2a 134 belonging to the ACR 2 132.

The mobile terminal 150 moves between radio access stations belonging to different access control routers, and induces the handover procedure (S301). In this case, the RAS 1b 126 and the RAS 2a 134 complete a link-layer handover procedure between the radio access stations according to the IEEE 802.16e and WiMAX Forum NWG Stage 2/3 procedures (S302).

The mobile terminal 150 performs an agent discover procedure defined in the mobile IP protocol to obtain a CoA address (S303). The mobile terminal 150 performs an agent discover in order to examine whether the mobile terminal 150 is currently in the home network or the foreign network. If it is determined that the mobile terminal 150 is in the foreign network, the mobile terminal 150 obtains the CoA address from the FA.

The mobile terminal 150 transmits a mobile IP registration request message including the HoA address information and the CoA address information to the access control router 2 132 (S304). An access control router performs an FA function. Accordingly, the access control router 2 132 updates its visitor list by referring to the HoA address information and the CoA address information included in the registration request message.

The access control router 2 132 transmits the received mobile IP registration request message to the HA 140 (S305). Upon receipt of the registration request message, the HA 140 updates its mobility binding list using the CoA information in the received registration request message.

In response to the registration request message, the HA 140 generates a mobile IP registration response message and transmits the same to the access control router 2 132 (S306). Upon receipt of the registration response message, the access control router 2 132 transmits the message to the mobile terminal 150 to complete a new CoA registration procedure (S307).

FIGS. 4A, 4B and 4C illustrate paths for a packet transmitted from the CN to the MS before, during, and after conventional handover between access control routers. In FIGS. 4A to 4C, it is assumed that the handover is performed from an old RAS belonging to an old ACR to a new RAS belonging to a new ACR.

FIG. 4a illustrates the packet delivery path before the handover. Before the handover between the access control routers occurs, the CN 160 generates an IP packet having the HoA of the MS 150 as a destination address and transmits the same to the network (step A). When this packet is transmitted to the HA 140, the HA 140 creates a new IP header having an old CoA address of the MS 150 as a destination address using an IP tunneling technique, so that the packet is routed to the old ACR (step B). The old ACR removes the IP tunnel header generated by the HA 140 and transmits the packet to the old RAS via a tunnel (e.g., a GRE Tunnel) (step C). Upon receipt of the packet, the old RAS removes the tunnel header again and transmits an IP packet having the HoA as a destination address to the MS 150 (step D), so that the MS 150 normally receives the packet.

FIG. 4B illustrates the packet delivery path during the handover. During the handover between the ACRs, a packet is subject to IP-in-IP tunneling through an old CoA until a registration request message from the MS 150 arrives at the HA 140. Accordingly, the packet is transmitted to the old ACR (step B). Since the old ACR retains information on the MS 150 in the visitor list until the lifetime expires, the old ACR removes an IP tunnel header generated by the HA 140 and transmits the packet to the old RAS via a tunnel (step C). Upon receipt of the packet, the old RAS transmits an IP packet having a HoA in the tunnel as a destination address to the MS 150 (step D). However, since the MS 150 has been disconnected from the existing RAS, i.e., the old RAS, all packets directed to the MS 150 are discarded during this period.

FIG. 4C illustrates the packet delivery path after the handover. When handover between the ACRs is terminated and a packet is transmitted to the HA 140, the HA 140 creates a new IP header having a new CoA address as a destination address, so that the packet is routed to the new ACR (Step B'). The new ACR removes the tunnel IP header created by the HA 140 and transmits the resultant packet to the new RAS via a tunnel (step C'). Upon receipt of the packet, the new RAS transmits an IP packet having a HoA in the tunnel as a destination address to the MS 150 (step D), so that the MS 150 normally receives the packet.

The packets directed to the terminal are transmitted to the old access control router from the point that the terminal is disconnected from the old access control router to the point that the mobility binding list of the HA is updated in a conventional mobile IP protocol. However, since the terminal is disconnected from the old access control router, the packets are discarded.

It takes a time to register new address information of the terminal in the HA. If such a delay time is longer, a greater amount of packets is discarded. The loss of the packets greatly reduces a size of a congestion window in the transport layer, which degrades yield upon the handover.

SUMMARY OF THE INVENTION

It is an object of the present invention to provide a method in which, when a mobile terminal moves between access control routers, IP packets stored in buffers of an old access control router and an old radio access station are transmitted to a new radio access station via a created tunnel, such that the packets are transmitted to the mobile terminal without loss even when the handover occurs from the old radio access station to the new radio access station and also seamless network connection service is provided even upon the handover of the mobile terminal.

A first aspect of the present invention provides a method for transmitting mobile IP packets while a mobile terminal moves from a first radio access station to a second radio access station, the method comprising the steps of storing a first packet not transmitted to the mobile terminal in the first radio access station whenever a handover indication message is received, processing a link-layer handover procedure between the first radio station and the second radio station, creating a first tunnel between the first radio access station and the second radio access station after the link-layer handover procedure is completed, and transmitting the first packet stored in the first radio access station to the second radio access station via the first tunnel.

The method may further comprise the steps of removing, by a first access control router that is coupled to the first radio station, an IP tunnel directed to the mobile terminal whenever the handover indication message is received, and storing a second packet directed to the mobile terminal in the first access control router.

The method may further comprise the steps of creating a second tunnel between the first access control router and the second radio access station after the first packet stored in the first radio access station is transmitted, and transmitting the second packet stored in the first access control router to the second radio access station via the second tunnel.

The step of transmitting the first packet may further comprise steps of creating a first IP header having an address of the second radio access station as a destination address, and routing the first packet to the second radio access station by adding the first IP header to the first packet. The method may further comprise the steps of removing, by the second radio access station, the first IP header from the transmitted first packet, and transmitting the header-removed first packet to the mobile terminal.

The step of the transmitting the second packet may further comprise the steps of creating a second IP header having an address of the second radio access station as a destination address, and routing the second packet to the second radio access station by adding the second IP header to the second packet. The method may further comprise the steps of removing, by the second radio access station, the second IP header from the transmitted second packet, and transmitting the header-removed second packet to the mobile terminal.

The method may further comprise the step of transmitting, by the mobile terminal, a registration request message to a second access control router that is coupled to the second radio station, whenever the link-layer handover procedure is complete. The method may further comprise the steps of selectively filtering, by the second access control router, a packet including the registration request message, and transmitting the packet to a foreign agent module.

A second aspect of the present invention provides a system for transmitting mobile IP packets, the system comprises a radio access station for creating a first tunnel to a new radio access station upon a handover of a mobile terminal in which the mobile terminal moves from the radio access station to the new radio access station, and an access control router for creating a second tunnel to the new radio access station upon the handover the mobile terminal. The radio access station stores a first packet not transmitted to the mobile terminal in the radio access station, and transmits the first packet stored in the radio access station to the new radio access station via the first tunnel. The access control router stores a second packet directed to the mobile terminal in the access control router, and transmits the second packet stored in the access control router to the new radio access station.

In the system, the radio access station may comprise a buffer manager for storing first packet not transmitted to the mobile terminal upon the handover of the mobile terminal, a tunnel manager for creating the first tunnel for transmitting the first packet, and a data forwarder for processing an IP header on a packet and forwarding the packet to the mobile terminal. The access control router may comprise a buffer manager for storing the second packet directed to the mobile terminal upon the handover of the mobile terminal, a tunnel manager for creating the second tunnel for transmitting the second packet, and a data forwarder for processing an IP header on a packet and forwarding the packet to the mobile terminal.

The system may further comprise a home agent (HA) for managing a mobility binding list that includes a home address (HoA) of the mobile terminal, a care-of-address (CoA) indicating a current connection location of the mobile terminal, and an expiration time of the information included in the binding list. The HA may update the mobility binding list by referring to a CoA address included in a registration request message upon receipt of the registration request message from a new access control router that is coupled to the new radio access station.

In the system, the access control router may manage a visitor list that includes a home address (HoA) of the mobile terminal, a care-of-address (CoA) indicating a current connection location of the mobile terminal, a home agent (HA) address, and an expiration time of the information included in the visitor list. The access control router may further comprise a foreign agent module for maintaining and managing the visitor list and referring the visitor list to transmit IP packets to a destination. The access control router may update the visitor list by referring to a HoA address and a CoA address included in a registration request message upon receipt of the registration request message from the mobile terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate like components, wherein:

FIG. 3 illustrates a conventional handover procedure between different access control routers in a WiMAX network;

DETAILED DESCRIPTION OF EXEMPLARY EMBODIMENTS

A method and system of transmitting lossless mobile IP packets according to the present invention will be described in detail with reference to the accompanying drawings.

Figure 5:
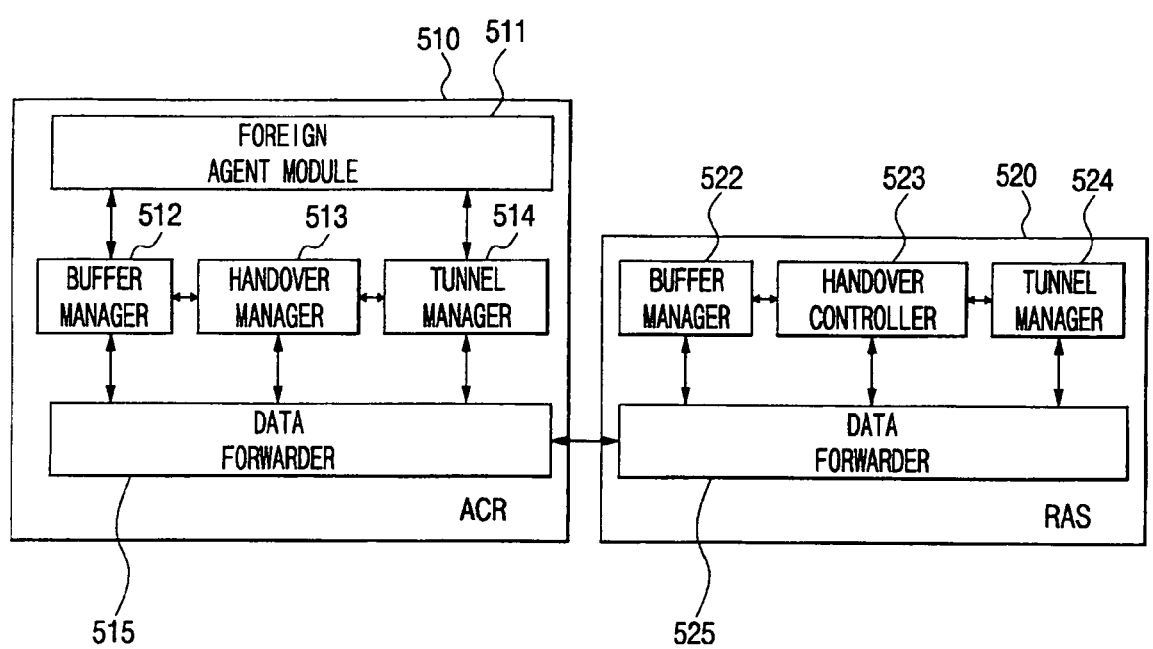
FIG. 5 is a block diagram illustrating an access service network for supporting lossless mobile IP handover according to the present invention.

FIG. 5 is a block diagram illustrating an access service network for supporting lossless mobile IP handover according to the present invention. In the present invention, the access service network comprises an Access Control Router (ACR) 510 and a Radio Access Station (RAS) 520. The access control router 510 comprises a foreign agent module 511, a buffer manager 512, a handover manager 513, a tunnel manager 514, and a data forwarder 515. The radio access station 520 comprises a buffer manager 522, a handover controller 523, a tunnel manager 524, and a data forwarder 525.

The foreign agent module 511 maintains and manages a visitor list, and refers to the same to transmit an IP packet to a destination via the tunnel manager 514. The foreign agent module 511 exists only in the access control router 510. However, the components described below may exist in both the access control router 510 and the radio access station 520 and perform the same function in the access control router 510 and the radio access station 520.

Upon the handover of a mobile terminal, the buffer managers 512 and 522 store packets directed to the terminal and manage the stored packets until the packets are transmitted via a tunnel with a new RAS. The handover manager 513 and the handover controller 523 provide a handover function defined in the IEEE 802.16e. The tunnel managers 514 and 524 create/manage/delete an IP-in-IP tunnel for transmitting IP packets to other equipment connected to the network. The data forwarders 515 and 525 forward data transmitted/received by the mobile terminal and perform IP routing or forwarding and MAC header processing.

Figure 6:
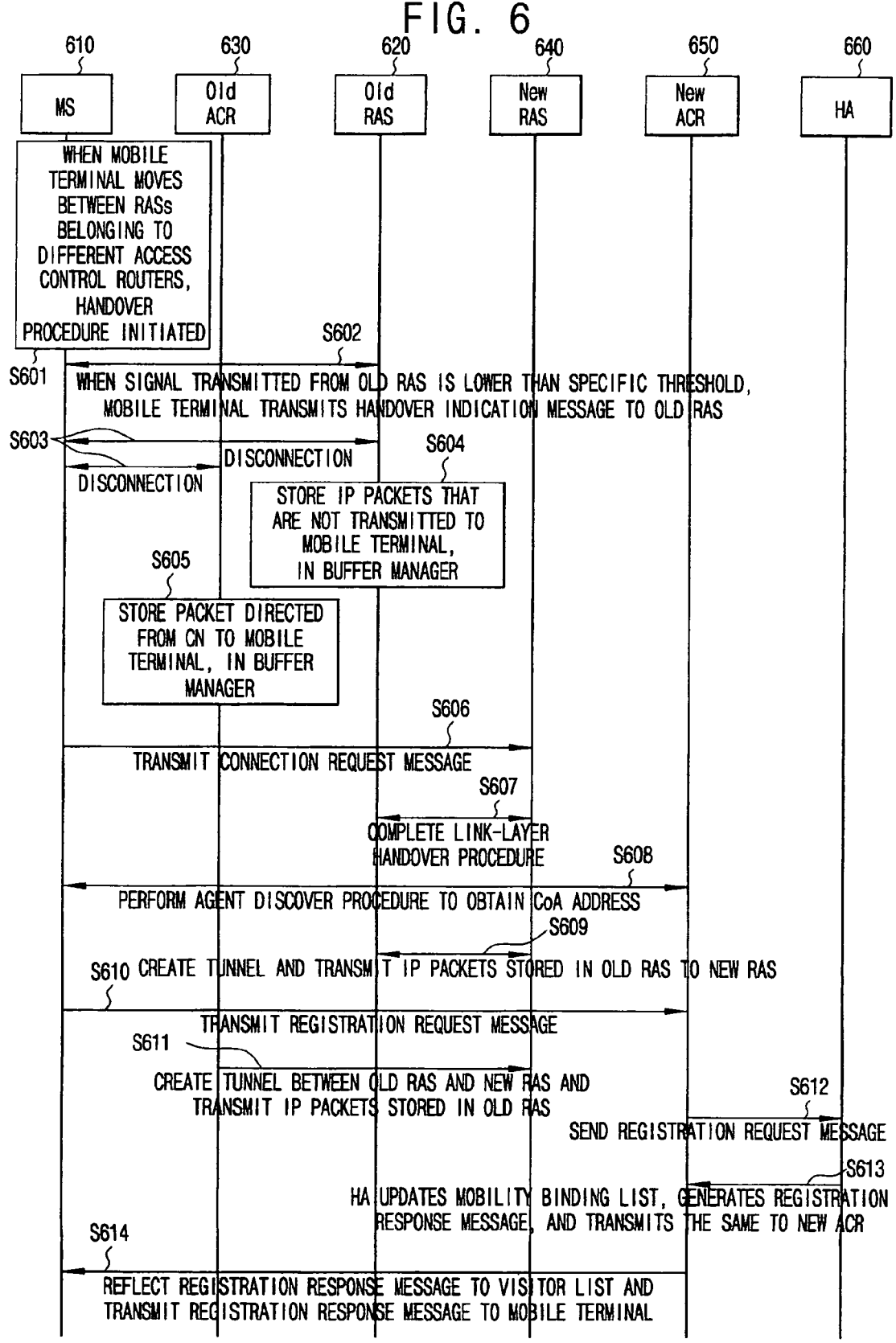
FIG. 6 illustrates a lossless mobile IP handover procedure according to the present invention.

FIG. 6 illustrates a lossless mobile IP handover procedure according to the present invention. When the mobile terminal 610 moves from an old RAS 620 to a new RAS 640, both of them belonging to different access control routers, the handover procedure is initiated (S601). When a signal transmitted from the old RAS 620 is lower than a specific threshold, the mobile terminal 610 transmits a handover indication message MOV_HO-IND to the old RAS 620 (S602). In this case, the mobile terminal 610 is disconnected from the old RAS 620 and the old ACR 630 (S603).

When the old RAS 620 receives the handover indication message MOV_HO-IND, it stores IP packets that are not transmitted to the mobile terminal 610 in the buffer manager of the old RAS 620 (S604). Also, when the old ACR 630 receives the handover indication message MOV_HO-IND, the foreign agent module 511 in the old ACR 630 removes the mobile IP tunnel from a packet directed from the CN to the mobile terminal 610 and stores the resultant packet in the buffer manager of the old ACR 630 (S605).

The mobile terminal 610 transmits a connection request message RNG-REQ to the new RAS 640 to initialize a connection with the new RAS 640 and establishes a new connection (S606). In this case, the connection is established between the mobile terminal 610 and the new ACR 650. The old RAS 620 and the new RAS 640 complete the link-layer handover procedure according to a procedure defined in IEEE 802.16e and WiMAX NWG stage documents (S607). The mobile terminal 610 then performs an agent discover procedure defined in the mobile IP protocol to obtain a CoA address (S608). The old RAS 620 creates a tunnel with the new RAS 640 while performing the link-layer handover, and transmits the IP packets stored in the old RAS 620 to the new RAS 640 via the tunnel after completing the agent discover procedure (S609).

Meanwhile, when the agent discover procedure is completed, the mobile terminal 610 transmits a registration request message including HoA address information and CoA address information to the new ACR 650 (S610). In this case, as the physical path and the traffic tunnel are differently established in the handover procedure according to the present invention, the registration request message may be discarded in the old ACR. A detailed description thereof and a solution thereto will be described later with reference to FIG. 7.

After the packets stored in the old RAS 620 are transmitted, the old ACR 630 transmits the IP packets stored in the old ACR 630 in step S605, which is directed from the CN to the mobile terminal 610, via the tunnel with the new RAS 640 established in the link-layer handover procedure (S611). Upon receipt of the registration request message, the new ACR 650 sends the message to the HA 660 (S612). When the registration request message is received, the HA 660 refers to the CoA address information included in the message to update its mobility binding list, generates a registration response message in response to the registration request message, and transmits the same to the new ACR 650 (S613). Upon receipt of the registration response message from the HA 660, the new ACR 650 reflects the same to its visitor list and transmits the registration response message to the mobile terminal 610 (S614).

Figure 7:
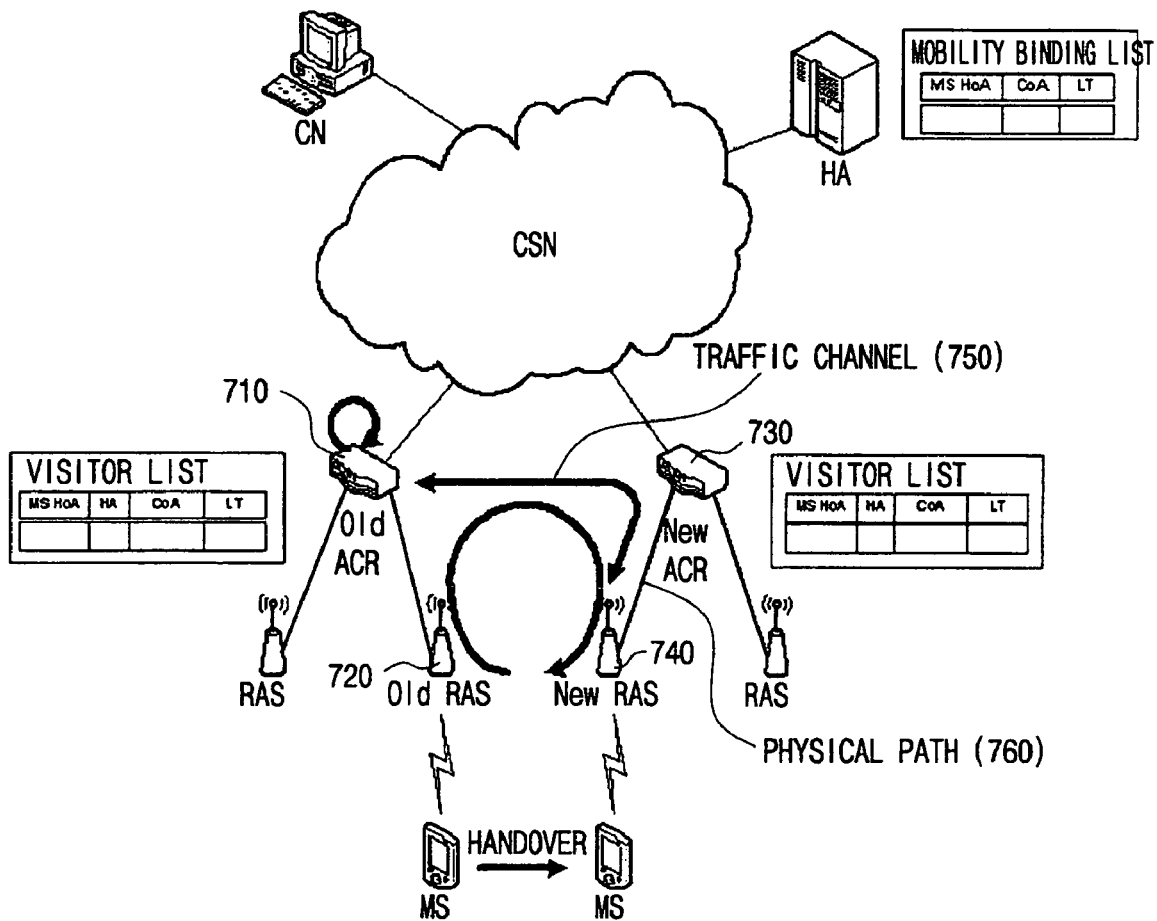
FIG. 7 illustrates a traffic channel and a physical path established upon handover according to the present invention.

FIG. 7 illustrates a traffic channel and a physical path established upon handover according to the present invention. Upon the handover, a physical path 760 is established between a new ACR 730 and a new RAS 740, and a traffic tunnel 750 is established between an old ACR 710 and a new RAS 740. Accordingly, the registration request message bypasses the new ACR 730 and is transferred to the old ACR 710. However, if a packet is transmitted in this moment, the message may be discarded in the old ACR 710. Accordingly, it is necessary that the new ACR 730 separately filters only a UDP port number 434 packet and transmits the same to a foreign agent (FA). In the present invention, a filtering rule may be additionally set and performed in the data forwarder 515 of the FIG. 5.

Figure 1:
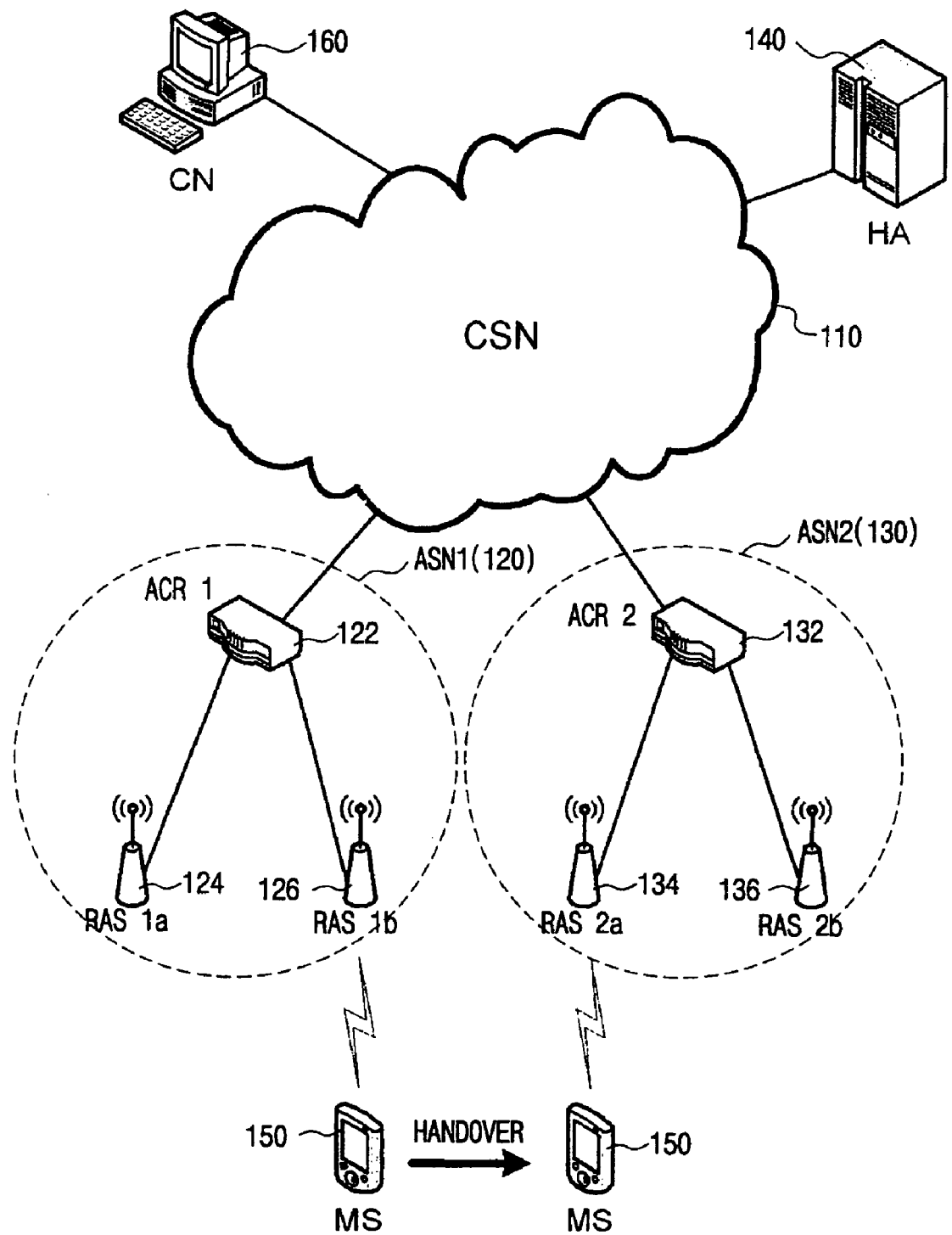
FIG. 1 illustrates a configuration of a mobile WiMAX network.
Figure 2A:
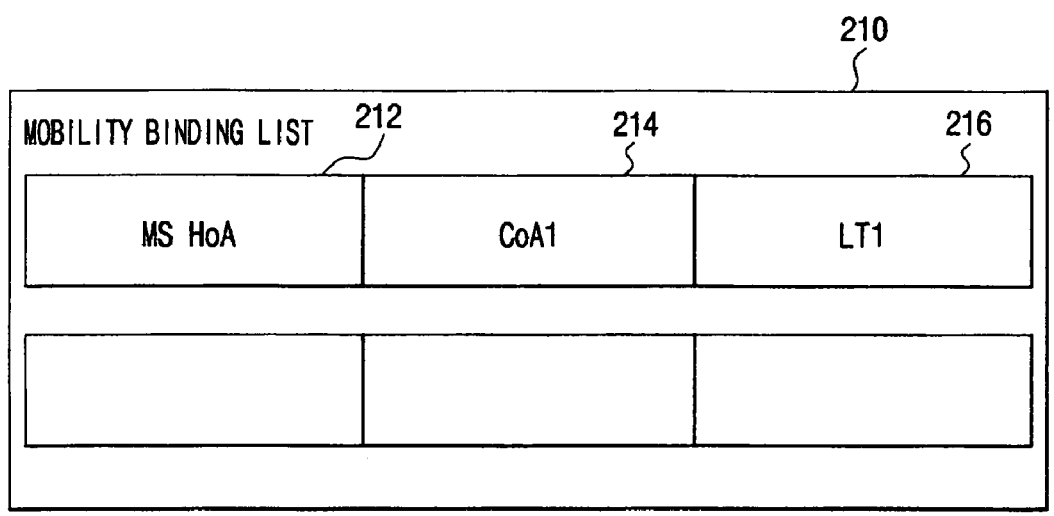
FIG. 2A illustrates a mobility binding list managed by a home agent (HA)
Figure 2B:
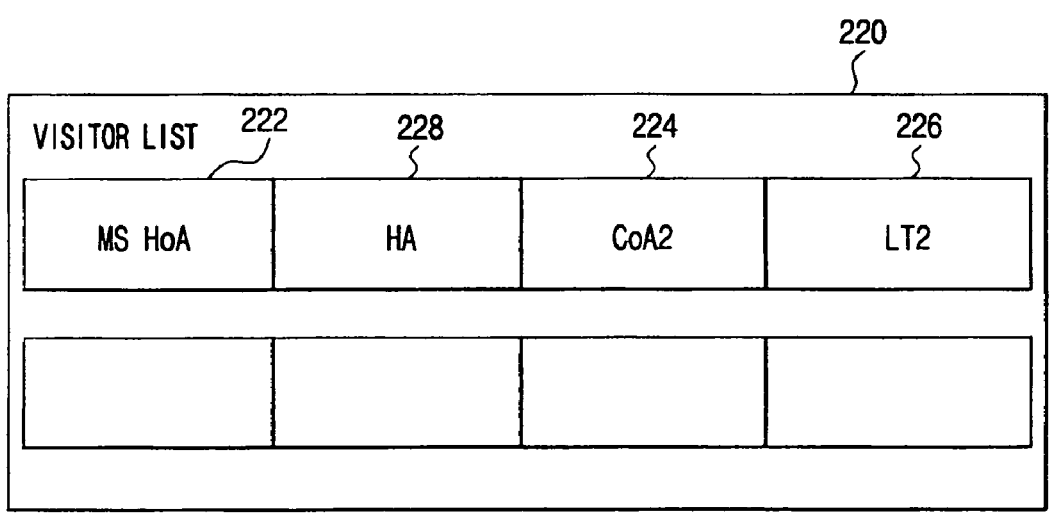
FIG. 2B illustrates a visitor list managed by a foreign agent (FA)
Figure 4A:
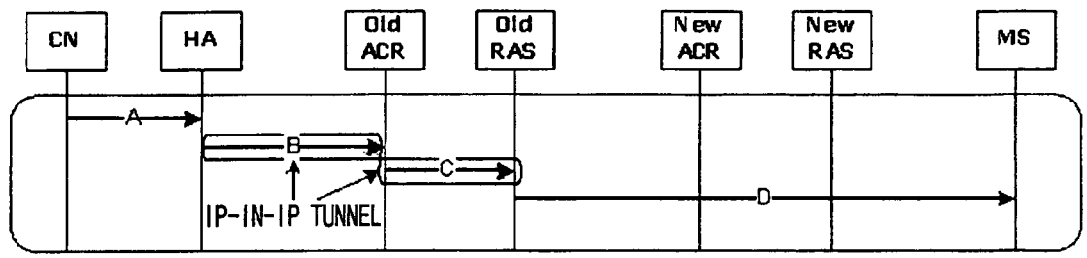
FIG. 4A illustrates a path for a packet transmitted from a correspondent node (CN) to an MS before conventional handover between access control routers.
Figure 4B:
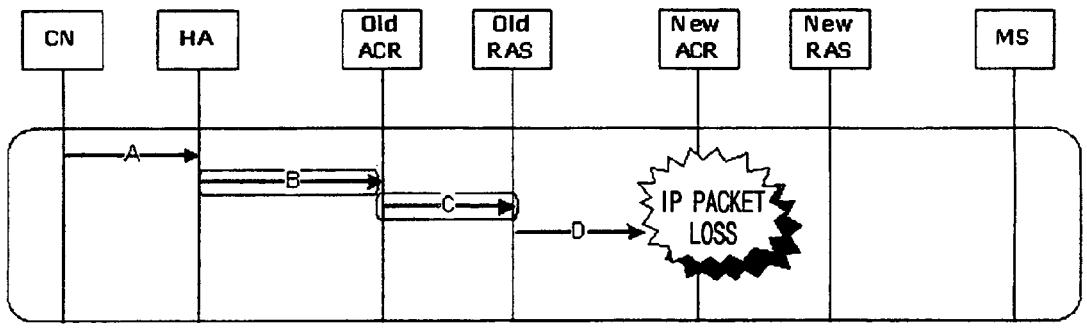
FIG. 4B illustrates a path for the packet transmitted from the CN to the MS during the conventional handover between access control routers.
Figure 4C:
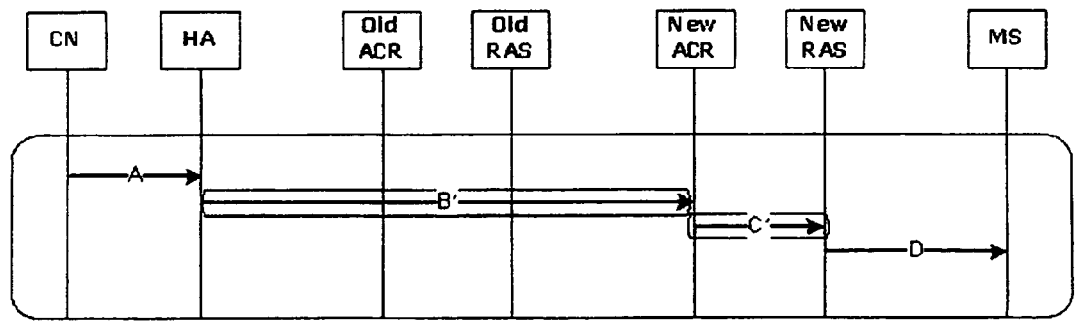
FIG. 4C illustrates a path for the packet transmitted from the CN to the MS after the conventional handover between access control routers.
Figure 8A:
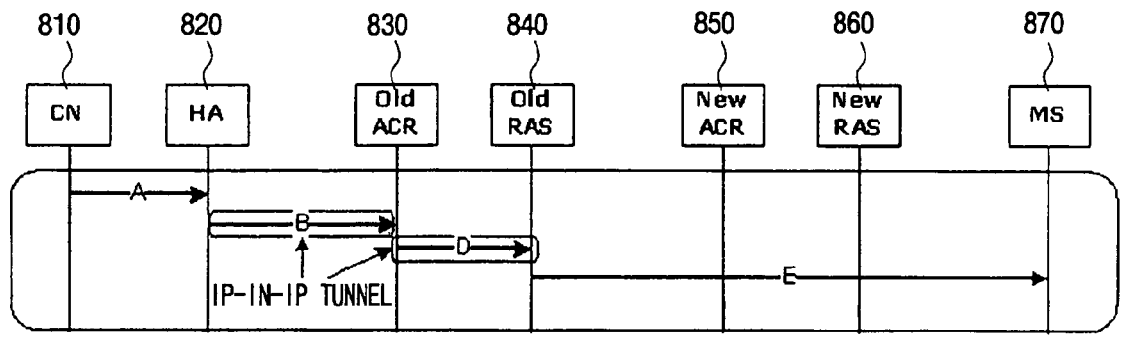
FIG. 8A illustrates a path of a packet transmitted from the CN to the MS before handover between access control routers according to the present invention.
Figure 8B:
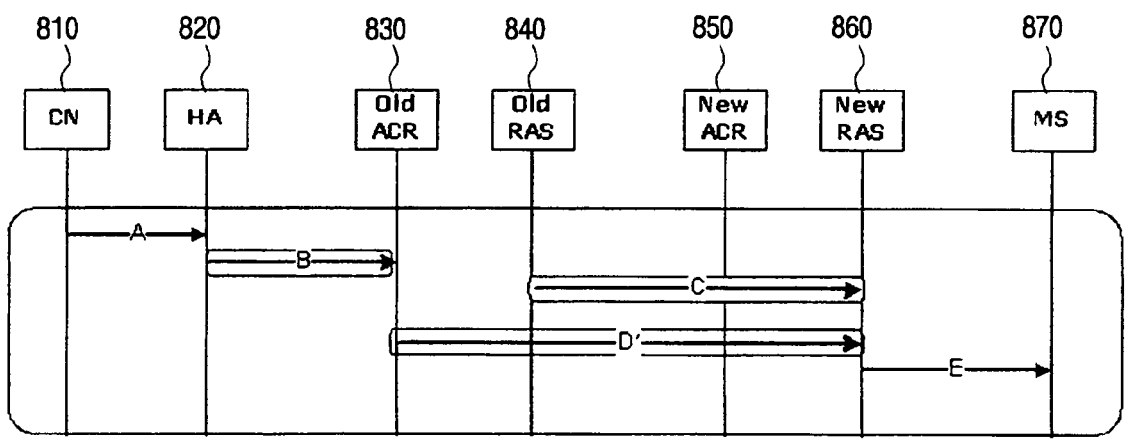
FIG. 8B illustrates a path of a packet transmitted from the CN to the MS during handover between access control routers according to the present invention.
Figure 8C:
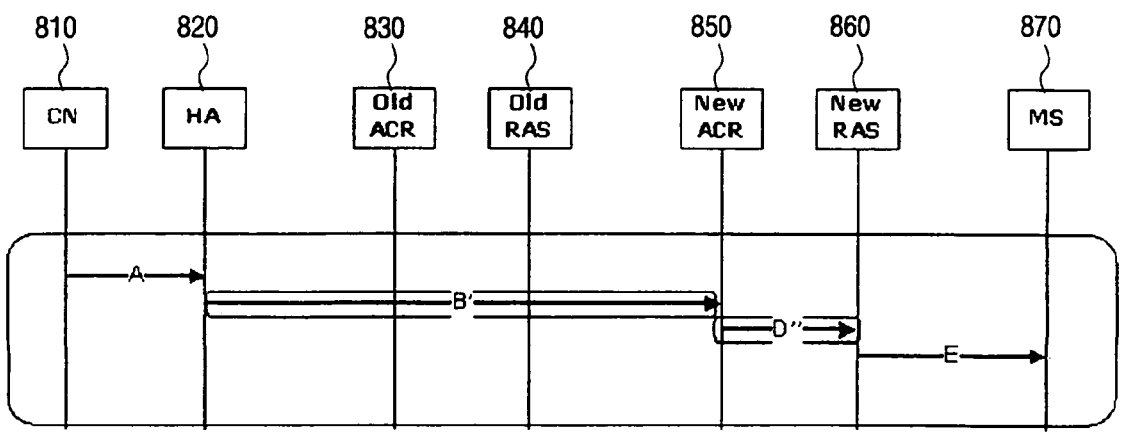
FIG. 8C illustrates a path of a packet transmitted from the CN to the MS after handover between access control routers according to the present invention.
Figure 8D:
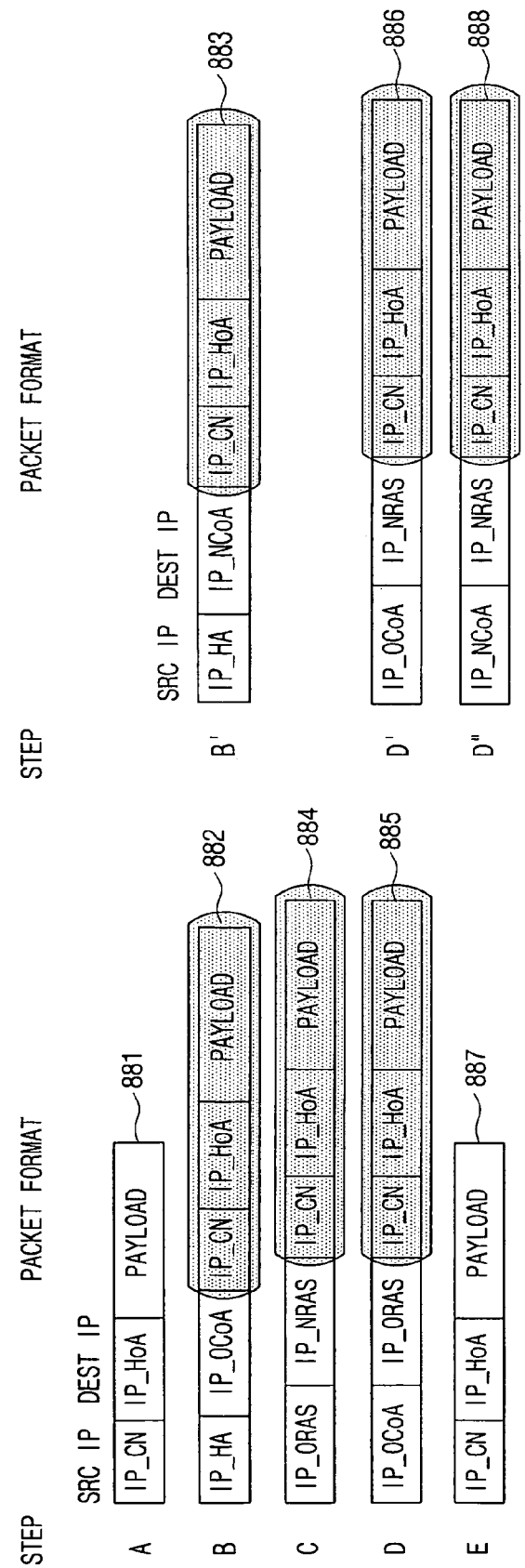
FIG. 8D illustrates a format of the packet transmitted from the CN to the MS in the handover procedure according to the present invention.

FIGS. 8A, 8B and 8C illustrate paths of a packet transmitted from a CN to an MS before, during, and after handover between access control routers according to the present invention, and FIG. 8D illustrates a format of the packet transmitted from the CN to the MS in the handover procedure of FIGS. 8a to 8c. Since the packet delivery paths and formats before and after the handover are the same as those in the conventional technique described referring to FIGS. 4A and 4C, a description thereof will be omitted and only the packet delivery path and the packet format during the handover will be now described. The packet delivery path during the handover is shown in FIG. 8B.

During the handover between the access control routers 830 and 850, a packet is subject to IP-in-IP tunneling via an old CoA before a registration request message from an MS 870 arrives at an HA 820. Accordingly, the packet is transmitted to an old ACR 830. The old ACR 830 stores the received packets in the buffer (step B). When link-layer handover and agent discover procedures are completed, an old RAS 840 transmits the packets directed to the MS 870, which are stored in a buffer manager of the old RAS 840, to a new RAS 860 via a tunnel (step C). A tunnel header created with the new RAS 860 is added to the IP packets stored in the buffer manager of the old ACR 830, which are then transmitted to the new RAS 860 (step D'). The new. RAS 860 sends the IP packet from the old RAS 840 and the old ACR 830 to the MS 870 (step E).

FIG. 8D illustrates the format of the packet transmitted from the CN to the MS in respective steps of the handover procedure in FIGS. 8A to 8C.

In FIG. 8D, Src IP is an abbreviation of a source IP and indicates a source address. Dest IP is an abbreviation of a destination IP and indicates a destination address. The packet format includes several IP address fields. For example, IP_OCoA indicates a CoA address allocated to the mobile terminal before the handover, and IP_NCoA indicates a CoA address allocated to the mobile terminal after the handover. Likewise, IP_ORAS indicates an address of the old RAS before the handover, and IP_NRAS indicates an address of the new RAS after the handover.

In step A shown in FIG. 8D, a format 881 of a packet transmitted from the CN 810 to the MS 870 includes IP_CN as a source address and IP_HoA as a destination address. In step E shown in FIGS. 8A and 8C, a format 887 of a packet transmitted from the CN 810 to the MS 870 is the same. However, in step B, since the handover is not yet completed, a new IP header having the old CoA address of the MS 870 as the destination address is created in a format 882 of a packet so that the packet is routed to the old ACR 830. Accordingly, the source address is IP_HA and the destination address is IP_OCoA.

In step D, since the old ACR 830 removes the IP tunnel header created by the HA 820 and transmits the resultant packet to the old RAS 840, the source address in a packet format 885 is IP_OCoA and the destination address is IP_O-RAS.

Referring to FIG. 8B showing the path of the packet transmitted from the CN 810 to the MS 870 during the handover, in step C, when the link-layer handover procedure defined between the old RAS 840 and the new RAS 860 is completed, the old RAS 840 transmits the IP packets, which are stored in the old RAS 840, to the new RAS 860 via the tunnel. In the packet 884 transmitted in step C, the source address and the destination address are IP_ORAS and IP_NRAS, respectively.

In step D', after the packet stored in the old RAS 840 is transmitted, the old ACR 830 transmits the IP packets stored in the old ACR 830, which are directed from the CN 810 to the MS 870, to the new RAS 860 via a new tunnel. In the packet 886 transmitted in step D', the source address and the destination address are IP_OCoA and IP_NRAS, respectively. It can be seen from steps B' and D" that the format of the transmitted packet differs from the packet format before the handover. A format 883 of the packet transmitted in step B' includes the new CoA address as the destination due to completion of the handover. Accordingly, the destination address is IP_NCoA, unlike the packet transmitted in step B. Also, a format 888 of a packet transmitted in step D" includes IP_NRAS as a destination address.

According to the present invention, upon the handover of the mobile terminal, IP packets directed to the old access control router and the old radio access station are stored in the buffer and then transmitted via the tunnel after the handover, thereby preventing packet loss during the handover. Thus, yield cannot be degraded upon the handover and seamless network connection service can be provided.

While the present invention has been described with reference to exemplary embodiments thereof, it will be understood by those skilled in the art that various changes in form and detail may be made therein without departing from the scope of the present invention as defined by the following claims.

What is claimed is:

1. A method to transmit a mobile IP packet, the method comprising:
   storing a first packet not transmitted to a mobile terminal in a first radio access station in response to receiving a handover indication message while the mobile terminal moves from the first radio access station to a second radio access station;
   removing, by a first access control router coupled to the first radio access station, an IP tunnel directed to the mobile terminal in response to receiving the handover indication message;
   storing a second packet directed to the mobile terminal in the first access control router;
   processing a link-layer handover procedure between the first radio station and the second radio station;
   creating a first tunnel between the first radio access station and the second radio access station after the link-layer handover procedure is completed; and
   transmitting the first packet stored in the first radio access station to the second radio access station via the first tunnel;
   creating a second tunnel between the first access control router and the second radio access station after the first packet stored in the first radio access station is transmitted; and transmitting the second packet stored in the first access control router to the second radio access station via the second tunnel.

2. The method according to claim 1, wherein transmitting the first packet comprises:
   creating a first IP header comprising an address of the second radio access station as a destination address; and routing the first packet to the second radio access station by adding the first IP header to the first packet.

3. The method according to claim 2, further comprising:
removing, by the second radio access station, the first IP header from the transmitted first packet; and
transmitting the header-removed first packet to the mobile terminal.

4. The method according to claim 1, wherein transmitting the second packet comprises:
creating a second IP header comprising an address of the second radio access station as a destination address; and
routing the second packet to the second radio access station by adding the second IP header to the second packet.

5. The method according to claim 4, further comprising:
removing, by the second radio access station, the second IP header from the transmitted second packet; and
transmitting the header-removed second packet to the mobile terminal.

6. The method according to claim 1, further comprising:
transmitting, by the mobile terminal, a registration request message to a second access control router coupled to the second radio station after the link-layer handover procedure is complete.

7. The method according to claim 6, further comprising:
selectively filtering, by the second access control router, a packet comprising the registration request message; and
transmitting the packet comprising the registration request message to a foreign agent module.

8. A system to transmit a mobile IP packet, the system comprising:
a first radio access station to create a first tunnel to a second radio access station upon a handover of a mobile terminal in which the mobile terminal moves from the first radio access station to the second radio access station, to store a first packet not transmitted to the mobile terminal in the first radio access station, and to transmit the first packet stored in the first radio access station to the second radio access station via the first tunnel; and
a first access control router to create a second tunnel to the second radio access station upon the handover of the mobile terminal, to store a second packet directed to the mobile terminal in the first access control router, and to transmit the second packet stored in the first access control router to the second radio access station.

9. The system according to claim 8, wherein the first radio access station comprises:
a buffer manager to store the first packet not transmitted to the mobile terminal upon the handover of the mobile terminal;
a tunnel manager to create the first tunnel to transmit the first packet; and
a data forwarder to process an IP header on a packet and to forward the packet with the IP header to the mobile terminal.

10. The system according to claim 8, wherein the first access control router comprises:
a buffer manager to store the second packet directed to the mobile terminal upon the handover of the mobile terminal;
a tunnel manager to create the second tunnel to transmit the second packet; and
a data forwarder to process an IP header on a packet and to forward the packet with the IP header to the mobile terminal.

11. The system according to claim 8, further comprising a home agent (HA) to manage a mobility binding list comprising a home address (HoA) of the mobile terminal, a care-of-address (CoA) indicating a current connection location of the mobile terminal, and an expiration time of the HoA and the CoA.

12. The system according to claim 11, wherein the HA updates the mobility binding list by referring to a CoA address included in a registration request message upon receipt of the registration request message from a second access control router coupled to the second radio access station.

13. The system according to claim 8, wherein the first access control router manages a visitor list comprising a home address (HoA) of the mobile terminal, a care-of-address (CoA) indicating a current connection location of the mobile terminal, a home agent (HA) address, and an expiration time of the HoA, the CoA, and the HA.

14. The system according to claim 13, wherein the first access control router further comprises a foreign agent module to maintain and manage the visitor list and to refer to the visitor list to transmit an IP packet to a destination.

15. The system according to claim 13, wherein the first access control router updates the visitor list by referring to a HoA address and a CoA address in a registration request message upon receipt of the registration request message from the mobile terminal.

16. The system according to claim 12, wherein the second access control router comprises a data forwarder to store a filtering rule, and wherein the second access control router selectively filters, using the filtering rule, a packet comprising the registration request message, and transmits the packet comprising the registration request message.

* * * * *